United States Patent [19]

Warren

[11] Patent Number: 4,470,608
[45] Date of Patent: Sep. 11, 1984

[54] RESILIENT GASKET HAVING AUXILIARY RESILIENCY MEANS

[75] Inventor: Charles M. Warren, Lake Jackson, Tex.

[73] Assignee: The Dow Chemical Company, Midland, Mich.

[21] Appl. No.: 528,697

[22] Filed: Sep. 1, 1983

Related U.S. Application Data

[63] Continuation-in-part of Ser. No. 388,415, Jun. 14, 1982, abandoned.

[51] Int. Cl.³ .............................................. F16J 15/12
[52] U.S. Cl. ................................. 277/164; 277/207 R; 277/226; 277/235 R
[58] Field of Search ............... 277/34, 34.3, 34.6, 277/164, 198, 205, 207 R, 207 A, 208–211, 226, 227, 235 R, 236, 901; 285/95, 100, 108, 109, 97, 230, 232, 235, 338, 345, 346, DIG. 11, DIG. 19; 251/DIG. 1; 174/35 GC; 49/477, 480, 481, 498

[56] References Cited

U.S. PATENT DOCUMENTS

| | | | |
|---|---|---|---|
| 2,306,160 | 12/1942 | Freyssinet | 277/34 |
| 2,315,588 | 4/1943 | Brickman | 277/226 X |
| 2,859,496 | 11/1958 | Nelson | 49/478 |
| 3,040,393 | 6/1962 | Dailey | 277/34 X |
| 3,508,587 | 4/1970 | Mauch | 49/498 X |
| 3,554,567 | 1/1971 | Carroll et al. | 277/164 |
| 3,591,963 | 7/1971 | Kopp | 277/34.3 X |
| 3,604,716 | 9/1971 | Webert | 277/203 X |
| 4,143,883 | 3/1979 | Paynter | 277/164 |

FOREIGN PATENT DOCUMENTS 475755 11/1937 United Kingdom ........... 277/207 A

Primary Examiner—Robert S. Ward
Attorney, Agent, or Firm—W. J. Lee

[57] ABSTRACT

Flexible, resilient gasketing material with auxiliary resiliency means, such as protuberances (ridges or beads) and internally-positioned spring means. The gaskets may be straight or curved or made into continuous forms such as rectangles, triangles, ovals, or circles. Preferably the gaskets are flanged.

20 Claims, 10 Drawing Figures

RESILIENT GASKET HAVING AUXILIARY RESILIENCY MEANS

CROSS-REFERENCE TO RELATED APPLICATION

This is a continuation-in-part of application Ser. No. 388,415 filed June 14, 1982 and now abandoned.

BACKGROUND OF THE INVENTION

There are various types of process equipment which require seals or gaskets between two or more sections, wherein leak-proof joints are desired, that will withstand the environment in which they are used and which will adjust to the expansions and contractions of the sections.

There are various sealing putties and gasketing which have been used for these purposes, but for the most part, they tend to lose their resistance to aggressive environments, or become brittle, or undergo compression-set to an extent that they lose resiliency and cannot continue to provide leak-proof joints between sections which undergo expansion and contraction.

I have now devised a gasketing arrangement which is ideally suitable for providing secure joints between sections of process equipment wherein a good seal is achieved, even though the sections undergo expansions and contractions.

SUMMARY OF THE INVENTION

Substantially as illustrated in figures attached herewith, there is provided an elongate strip or elliptical tube of flexible resilient material having auxiliary resilience means along its length, said elongate strip or elliptical tube preferably having a flange portion along one or both edges thereof, especially the inner edge. The elongate strip may be straight, or curved, or may be embodied as a structure having the general overall shape of a triangle, square, rectangle, polygon, circle, oval, or ellipse. The flange portions may lie in substantially the same general plane in which the elongate strip lies, or may be skewed from, or offset from the plane of the elongate strip.

BRIEF DESCRIPTION OF THE DRAWINGS

FIG. 1 is a view of a series of compartments having gasketry between compartments, there being a partial cutaway view of the gasketry in the inset circle.

FIG. 2 is a view of the compartment series of FIG. 1, taken along A—A of FIG. 1 to reveal another view of the gasketry between compartments.

FIG. 3 is an enlarged view of the inset within the circle shown in FIG. 1 and also shows spring members within within gasket (2).

FIG. 4 is a cross-sectional view of a portion of gasketry of FIGS. 1 and 3 to more clearly reveal the auxiliary resiliency means within a resilient gasketry material.

FIG. 5 is a cross-sectional view of auxiliary resiliency means of the type shown in FIGS. 3 and 4 and which can also be employed within the gasket of FIG. 4.

FIG. 6 is a view of a gasket which has an open space in the middle, into which auxiliary resiliency means can be placed, if desired, and which has auxiliary resiliency means protruding from the outer surfaces of the gasket and from the off-set flange.

FIG. 7 shows an alternate embodiment.

FIG. 8 shows another alternate embodiment, viz. a circular gasket with a central opening.

FIG. 9 is a sectional view taken on line B—B of FIG. 8.

FIG. 10 shows another alternate embodiment to illustrate counterbiased protuberances on the gasket surface.

DETAILED DESCRIPTION

Figure 1:
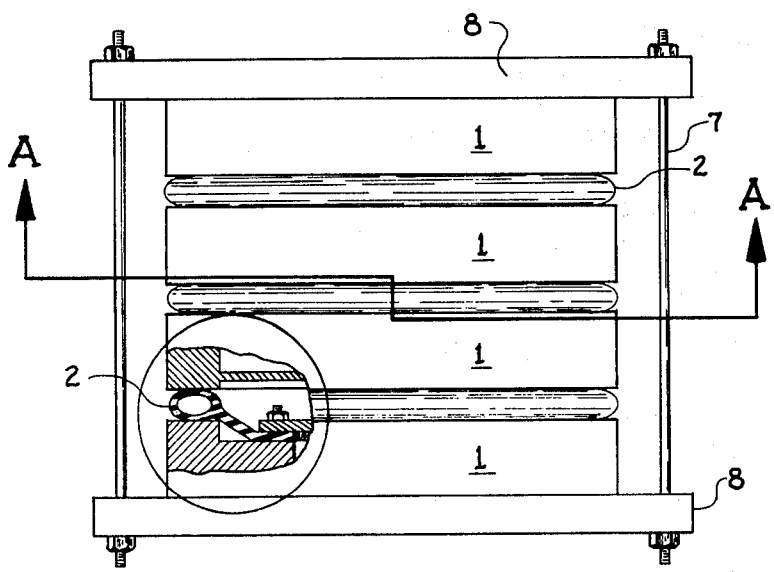
FIGS. 1-10, none of which are drawn to scale, are provided as visual aids in describing various embodiments of the present invention.

FIG. 1 may be considered as a top view of a horizontally-positioned series of compartments (1) with gaskets or seals (2) between the compartments, or may be considered as a side view of a vertically-stacked series of compartments (1). The series of compartments is shown as being held in place between end members (8) by tensioned rods (7), though other suitable means for mantaining the positions of the compartments may be used.

Figure 2:
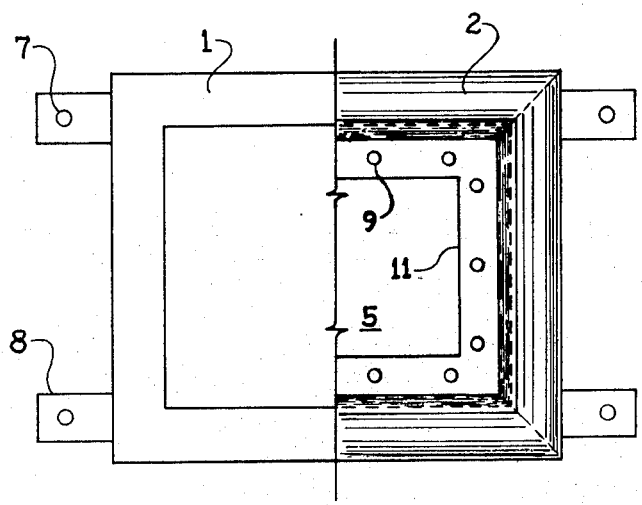

FIG. 2 is a view of FIG. 1 taken along offset line A—A of FIG. 1 and shows a rectangular shape of gasket (2) along an exposed edge of one of the compartments (1) which is, itself, shown to be of a "picture-frame" type of configuration. Holes (9) may be provided in a flanged portion (11) of gasket (2) for fastening purposes.

Figure 3:
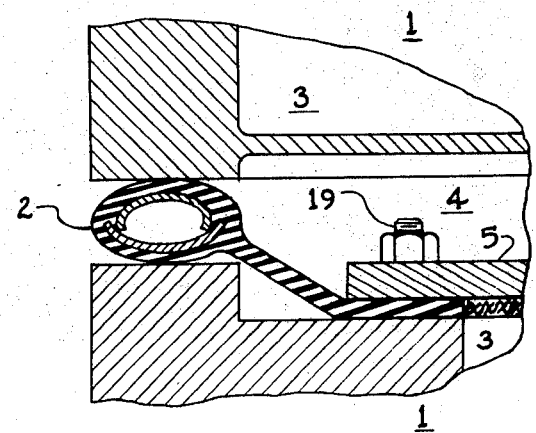

FIG. 3 is a enlarged cross-section view of a cutaway portion of FIG. 1 to reveal in greater detail the positioning of an embodiment of gasket (2) between two compartments (1) and to show use of fasteners (19) for fastening gasket (2) in place along the outer perimeter of a surface of a compartment divider (5). When installed, the divider provides a space (4) which is distinct from spaces (3) within the compartments (1). The means for fastening the flanged portion of gasket (2) and divider (5) is shown as a bolt-means, though other means may be used.

Figure 4:
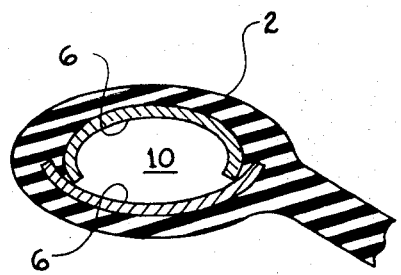

FIG. 4 is an enlarged cross-section view of a portion of gasket (2) to demonstrate positioning of metal spring means (6) which may be (and preferably are) used within an elliptically-shaped embodiment of gasket (2) having an elliptically-shaped centrally-located, opening (10) running the length of the gasket. The spring means (6) is described in FIG. 5.

Figure 5:
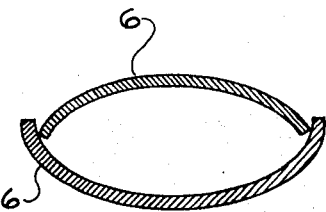

FIG. 5 illustrates an end-view or cross-sectional view of a preferred metal spring means for use inside various embodiments of the resilient gaskets of the present invention to provide auxiliary resiliency. As illustrated, the springs represent two elongate strips of spring steel which are curved along their length with the concave surfaces facing each other, forming an elliptically shaped area between them. When under compression the curved surfaces are forced closer together. As shown, the curved strips have a small distance between their cooperating edges to expedite movement of the edges when the springs are compressed; other means or configurations for obtaining expedient movement of the edges may be used. Preferably, the metal spring means are made of "spring steel" though any material which will undergo numerous compression-decompression cycles may be used. Other metal spring configurations may be used.

Figure 6:
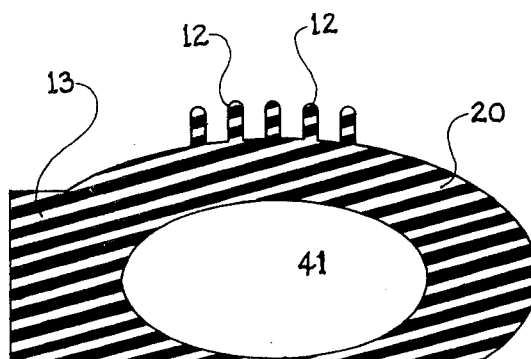

FIG. 6 illustrates, in cross-section, an embodiment wherein a gasket (20), having a flange-like extension (11) is provided with auxiliary resiliency means (12) as well an internal void area (41) and a stiffening edge (13) opposite the flange (11). The spring steel means of FIG.

5 may also be used within the (41) as an auxiliary resiliency means along with, or instead of, the auxiliary resiliency means (12). The auxiliary resiliency means (12) illustrate a plurality of resilient ridges or beads (protuberances) on the effective sealing surfaces of gasket (20). When used, the auxiliary means (12) may comprise a single ridge or bead, but preferably comprises a plurality of such ridges or beads which are parallel to each other. The ridges (12) may also be used, if desired, along the flange (11). The stiffening edge (13) may be used for structural purposes, such as for helping to avoid side-ways distortion of the gasket or as an aid in positioning the gasket during installation. The stiffening edge (13) may be thick enough, itself, to augment the total area of seal when gasket (20) is totally compressed, but should not be so thick that it will prevent the main effective portion of gasket (20) from being compressed the desired amount. Auxiliary reinforcement means may be provided in the stiffening edge (13), if desired, and/or functional tabs or flanges may be attached to stiffening edge (13). The flanged portion (11) is illustrated as being an offset (bent) member attached obliquely, but it may also be a substantially straight or flat member attached at a different angle than that shown in FIG. 6. Furthermore, the flanged portion (11) may be curved, as viewed in cross-section. Various configurations of the flanged portion (11) may be used, depending on the process equipment in which it is to be used. Protuberances (12) on the gasket and/or on the flange may be at right angles, as shown, from the surface or may (sometimes preferably) be at acute angles, especially when counterbiased.

Figure 7:
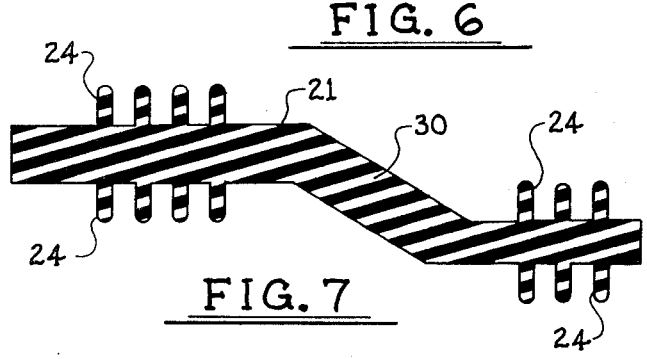

FIG. 7 illustrates an embodiment wherein the only auxiliary resiliency means for gasket (21) is that of a plurality of ridges or beads (24) positioned on the effective seal-surfaces of gasket (20) and arranged parallel to each other. If desired, the ridges or beads (24) may also be positioned along flange (30). In some cases a single ridge or bead (24) may be used along each sealing surface, but a plurality of such ridges or beads is generally preferred. The ridges (24) do not have to be at right angles to gasket (21).

Figure 8:
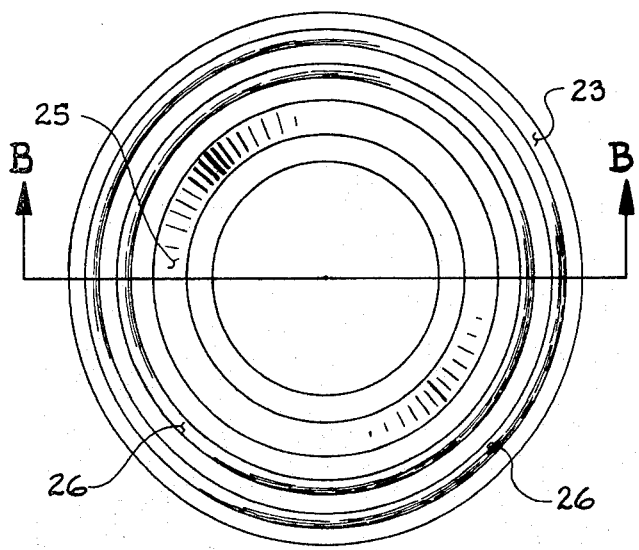

FIG. 8 illustrates an embodiment wherein a gasket (23) is circular and has ridges or beads (26) concentrically-located along the effective sealing surfaces of the gasket. Here again, the flange (25) is illustrated as an off-set, oblique member, but other configurations may be used. The drawing is not to scale and it will be realized that the central open area within the gasket may be much larger, relative to the entire dimensions, than is illustrated.

Figure 9:
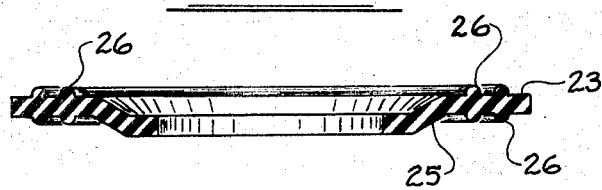

FIG. 9 is a cross-sectional view of gasket (23) taken along line B—B of FIG. 8 to more clearly show the ridges or beads (26) and to show the relative position of flange (25).

Figure 10:
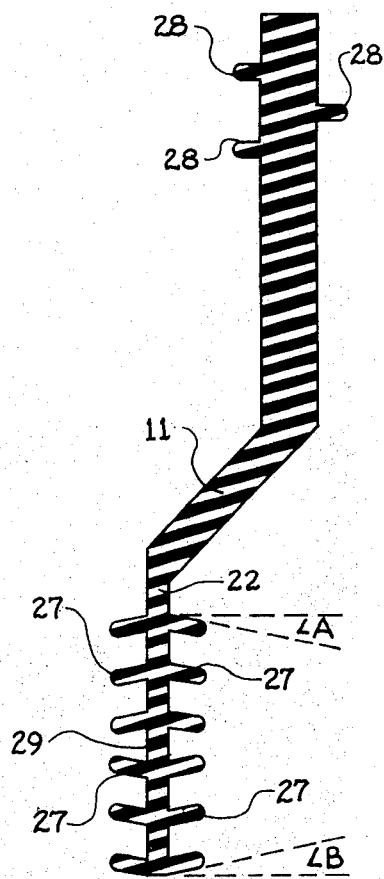

FIG. 10 is a cross-sectional view of a gasket (22) having paired counterbiased ridges or beads (27) which are intentionally made to be at an acute angle to gasket (22). Along each side of gasket (22) are shown three pairs of counterbiased ridges (27) arranged so that they bend toward the central portion (29) of gasket (22) when the configuration becomes compressed between two compartments, each compressed ridge overlapping the ridge toward which it bends. Only one such counterbiased pair of ridges along each side may be used, but a plurality of two or more such pairs is preferable. Protuberances (28) are illustrated as being at right angles to the surface of the off-set flange (11) but may also be at acute angles to the flange.

In FIG. 10, there is shown an angle ($\angle A$) which is counterbiased to an angle ($\angle B$) for the outside (i.e., the third) pair of ridges (27). Whereas the acute angle from gasket (22) for the counterbiased pairs of ridges may effectively be any angle less than 90°, it is preferable that it be in the range of about 75° to about 80°. For angles $\angle A$ and $\angle B$, it is most preferred to use a value of about 11°±1°.

The present invention, then, provides resilient gasketing material having auxiliary resiliency means comprising at least one of the following:

1. Resilient ridges or beads (protuberances) positioned along the effective sealing surfaces of the gasketing material, said ridges or beads being substantially parallel or concentric to each other;

2. Resilient ridges or beads positioned along the effective sealing surfaces of the gasketing material, said ridges or beads being substantially parallel or concentric to each other, said gasketing material containing a hollow portion (especially a hollow portion that is elliptical in cross-section) running internally through the gasketing material;

3. Spring members comprising elongate strips which are curved along their length, the curved portions forming, when viewed in cross-section, an elliptical shape, said spring members being positioned within a hollow portion of a gasket material which hollow portion conforms to the dimensions of said spring members;

4. Spring members positioned internally within an elongated gasket material, along the length of the gasket, said spring members responding resiliently to compression and decompression forces acting on the gasket;

5. Resilient ridges or beads as in Item 2 above, along with spring members as in Item 3 or 4 above.

The resilient gasketing material may be made of natural or synthetic rubber or resilient polymers, taking into account the environment to which the gasket is to be exposed. Polychloroprene rubber is usually a good choice as it has the ability to withstand contact with a large number of chemicals and can withstand moderately high temperatures. Rubbery formulations based on polybutene, polybutadiene, polyisoprene, fluoropolymers, polyvinylchloride, polysilicones, and the like may be used in many applications. The rubber formulations generally contain fillers or other additives to enhance their physical and chemical properties. Rubbery formulations covered with fluoropolymers or other flexible coatings or sheaths are within the purview of the present invention.

The resilient gasketing material can be prepared by molding-in the auxiliary resiliency means of the present invention. In some cases, it may be best to extrude, cast or mold the gasketing material as sections, including (if desired) the resilient ridges or beads, and then inserting the spring members between the sections and bonding the sections together. In other cases, the internally-positioned spring members may be included during the casting or molding operation. The flanges are preferably formed along with the gasket, but may be formed separately and then bonded to, or anchored to, the gasket.

The general configuration of the gasket can be that of straight gaskets or curved gaskets or may be continuous gaskets for use along triangular, square, rectangular, polygonal, curved, circular, oval, or elliptical surfaces.

While FIGS. 1–10 illustrate certain embodiments (not to scale) of the present invention, it will be understood that variations may be made without departing from the inventive concept expressed herein. For instance, more than one hollow portion may be used within the gasket and the internally-positioned spring members may be used in more than one area of the gasket.

Equipment in which these gaskets can be used may be, in size, from very small to very large and the concomitant gasket is conveniently sized for the particular equipment.

One of the greatest advantages of the present gaskets is that the gaskets, when used in very large structures are easily fastened in place by use of the flanges and a series of compartments can be more easily pressed together, horizontally, without having the gasket droop, sag, or slip out of place during the placement of the compartments. Furthermore the flanges can serve as gasketing for internal parts of the equipment, such as compartment dividers or separators, while serving to hold the main portion of the gasket in place.

The invention is limited only by the following claims.

I claim:

1. A resilient elongate gasket having a hollow portion running internally through the gasket along its length, said gasket having auxiliary resiliency means comprising resilient protuberances positioned in parallel along the effective sealing surfaces of the gasket, and spring members positioned in said hollow portion, along the length of the gasket, said spring members responding resiliently to compression and decompression forces acting on the effective sealing surfaces of the gasket.

2. The gasket of claim 1 wherein the protuberances comprise resilient ridges or beads.

3. The gasket of claim 1 wherein the spring members comprise convexical opposed elongate strips which are curved along their length, the curved strips forming, as viewed in cross-section, a generally oval configuration.

4. The gasket of claim 1 wherein the gasket has a flange means along its length on the inner edge thereof.

5. The gasket of claim 1 wherein the protuberances comprise at least one pair of counterbiased ridges or beads, said counterbiasness being evidenced by facing acute angles of the protuberances toward each other.

6. The gasket of claim 1 wherein the protuberances comprise at least one pair of counterbiased ridges or beads, said counterbiasness being evidenced by facing acute angles of the protuberances toward each other, said acute angles being defined by protuberances disposed at an angle of about 75° to about 80° from the gasket surface.

7. The gasket of claim 1 wherein the protuberances comprise at least one pair of counterbiased ridges or beads disposed at an acute angle of about 79°±1° from the gasket surface, said acute angles facing each other.

8. The gasket of claim 1 wherein the gasket has a flange means along its length on the inner edge thereof, said flange means having resilient protuberances along it length.

9. The gasket of claim 1 characterized by a flange along its inside edge, said flange means having resilient protuberances disposed at acute angles from its surface in counterbiased manner.

10. The flange of claim 1 characterized by a stiffening means along its outer edge.

11. The gasket of claim 1 wherein the gasket is a continuous gasket enclosing an area.

12. The gasket of claim 1 wherein the gasket is a continuous gasket enclosing a circular or oval area.

13. The gasket of claim 1 wherein the gasket is a continuous gasket enclosing a plane area having three or more sides.

14. The gasket of claim 1 wherein the gasket is a continuous gasket enclosing a plane area having four sides.

15. A gasket for sealing two mating surfaces of a container or vessel to maintain a fluid impervious seal therebetween comprising a resilient member having a general configuration matingly engagable with the mating surfaces and having auxiliary and cooperative resilient elements integral therewith consisting essentially of (a) at least one parallel pair of resilient protuberances extending from each side of said resilient member, said protuberances being positioned substantially normal to the direction of the exertion of pressure of the fluid within said vessel, and (b) matingly opposed spring-like elements internally positioned within said member to cooperatively exert resiliency, independent of said resiliency inherent in said member, toward the mating surfaces of the vessel.

16. The gasket of claim 15 wherein each pair of resilient protuberances are disposed from the surface of the member at acute angles therefrom and counterbiased from each other.

17. The gasket of claim 15 wherein said spring-like segments consist essentially of convexical opposed elongate strips of resilient metal which are curved along their lengths, the curved strips forming, as viewed in cross-section, a generally oval configuration.

18. The gasket of claim 15 further characterized as having a flange along its inner edge.

19. The gasket of claim 15 further characterized as having a stiffening means along its outer edge.

20. The gasket of claim 15 wherein it is a continuous gasket enclosing an area which may be oval, round, triangular, quadrangular, or polygonal.

* * * * *

UNITED STATES PATENT AND TRADEMARK OFFICE
CERTIFICATE OF CORRECTION

PATENT NO. : 4,470,608
DATED : September 11, 1984
INVENTOR(S) : Charles Martin Warren It is certified that error appears in the above—identified patent and that said Letters Patent is hereby corrected as shown below:

```
Col. 1, Line 59, "within" written twice; delete one of them;
Col. 1, Line 65, "4" should read --6--;
Col. 2, Line 19, "mantaining" should read -- maintaining --.
Col. 3, Line 1, after "the" insert --area--;
Col. 6, Line 36, "elements" should be --segments--.
```

Signed and Sealed this

Seventh Day of May 1985

[SEAL]

Attest:

DONALD J. QUIGG

Attesting Officer     Acting Commissioner of Patents and Trademarks